United States Patent
Kim et al.

(10) Patent No.: US 8,664,859 B2
(45) Date of Patent: Mar. 4, 2014

(54) AUTOMOTIVE LAMP

(76) Inventors: Jong-Un Kim, Gyeongbuk (KR); Jong-Ryoul Park, Gyeongbuk (KR)

( * ) Notice: Subject to any disclaimer, the term of this patent is extended or adjusted under 35 U.S.C. 154(b) by 565 days.

(21) Appl. No.: 13/048,151

(22) Filed: Mar. 15, 2011

(65) Prior Publication Data
US 2011/0227482 A1  Sep. 22, 2011

(30) Foreign Application Priority Data

Mar. 16, 2010 (KR) .......... 10-2010-0023358
Feb. 8, 2011 (KR) .......... 10-2011-0011063

(51) Int. Cl.
B60Q 1/14 (2006.01)
B60Q 1/00 (2006.01)
H05B 37/02 (2006.01)

(52) U.S. Cl.
USPC ............... 315/77; 315/82; 315/291; 362/465

(58) Field of Classification Search
USPC ............. 315/77, 82, 291, 307, 308; 362/358, 362/359, 465
See application file for complete search history.

(56) References Cited

U.S. PATENT DOCUMENTS

| | | | |
|---|---|---|---|
| 4,831,506 A | 5/1989 | Miyazawa | |
| 5,785,405 A | 7/1998 | Huhn | |
| 7,234,849 B2 * | 6/2007 | Hori et al. | 362/466 |

FOREIGN PATENT DOCUMENTS

| | | |
|---|---|---|
| DE | 10 2006 052 749 A1 | 5/2007 |
| DE | 10 2007 052 745 A1 | 5/2009 |
| JP | 2002-254980 A | 9/2002 |
| JP | 2006273092 A | 10/2006 |
| KR | 19970037337 | 7/1997 |
| KR | 1998-072626 A | 11/1998 |

OTHER PUBLICATIONS

Korean Office Action for Korean Patent Application No. 10-2011-0011063, dated Jul. 12, 2012.

* cited by examiner

Primary Examiner — Jimmy Vu
(74) Attorney, Agent, or Firm — Edwards Wildman Palmer LLP

(57) ABSTRACT

Provided is an automotive lamp, and more particularly, an automotive lamp which can secure a forward long-range field of view without requiring an additional light source. The automotive lamp having a plurality of light distribution patterns of Class-W, Class-V, Class-C, Class-E, and High and includes: a plurality of lamp units in which light-emitting diodes (LEDs) turned on or off according to each of the light distribution patterns or having different illumination patterns are installed; an actuator driving the lamp units; and a controller enabling a switch from any one of the light distribution patterns to another one of the light distribution patterns by controlling at least one of the actuator and a value of current supplied to each of the lamp units.

15 Claims, 13 Drawing Sheets

FIG. 2

| LIGHT DISTRIBUTION PATTERN | LAMP UNIT | ROAD SURFACE PATTERN |
|---|---|---|
| Class-V | 111, 112, 113, 114 | |

FIG. 3
| LIGHT DISTRIBUTION PATTERN | LAMP UNIT | ROAD SURFACE PATTERN |
|---|---|---|
| Class-C | 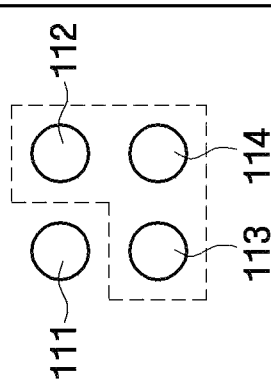 |  |

FIG. 6

| EMBODIMENT | REFERENCE (class-C) | 80km/h (class-E) | 90km/h (class-E) | 100km/h (class-E) |
|---|---|---|---|---|
| FIRST EMBODIMENT | CURRENT: 400 mA | CURRENT: 600 mA | CURRENT: 600 mA ELEVATION: 0.5° | CURRENT: 600 mA ELEVATION: 0.5°+0.5° |
| SECOND EMBODIMENT | ELEVATION: 0° | ELEVATION: 0.3° | ELEVATION: 0.3°+0.3° | ELEVATION: 0.3°+0.3°+0.3° |
| THIRD EMBODIMENT | CURRENT: 400 mA | CURRENT: 450 mA | CURRENT: 500 mA | CURRENT: 600 mA |

AUTOMOTIVE LAMP

This application claims priority from Korean Patent Application Nos. 10-2010-0023358 and 10-2011-0011063 filed on Mar. 16, 2010 and Feb. 8, 2011, respectively in the Korean Intellectual Property Office, the disclosure of which is incorporated herein by reference in its entirety.

BACKGROUND OF THE INVENTION

1. Field of the Invention

The present invention relates to an automotive lamp, and more particularly, to an automotive lamp which can secure a forward long-range field of view without requiring an additional light source.

2. Description of the Related Art

A vehicle is equipped with automotive lamps. Automotive lamps have a lighting function and a signaling function, among others. That is, automotive lamps enable the driver of the vehicle to easily detect objects around and ahead of the vehicle while driving at night or in a dark area. They also inform other vehicles and road users of the vehicle's driving state. For example, a headlamp and a fog lamp are designed for the lighting function, and a direction indicator, a taillight, a brake light, and a side marker are designed for the signaling function. Of these lamps, the automotive headlamp performs the essential function of securing the driver's field of view at night by emitting light in the same direction as the driving direction of the vehicle.

However, with such an automotive headlamp, it is difficult to provide an optimal driving environment according to driving conditions of a vehicle, such as travelling speed, road surface, and surrounding brightness. Therefore, a recent technology proposed an adaptive front lighting system that can change light distribution patterns according to driving conditions of a vehicle. The adaptive front lighting system uses mechanical structures, that is, includes a plurality of light shade parts for interrupting a portion of the light emitted from a light source to determine a light distribution pattern, thereby adaptively changing the light distribution pattern in accordance with driving conditions.

In addition, a light distribution pattern used when a vehicle is driving on a mostly straight road requires a longer forward long-range field of view than when other light distribution patterns are not needed since the vehicle is driving in no special conditions. Thus, an additional light source is used.

However, if a switch between light distribution patterns is made by using mechanical structures or if a forward long-range field of view is secured by using an additional light source, the structure becomes complicated, and cost and power consumption are increased.

SUMMARY OF THE INVENTION

Aspects of the present invention provide an automotive lamp which can secure a forward long-range field of view without requiring an additional light source by elevating a lamp unit in which a light source is installed.

Aspects of the present invention also provide an automotive lamp which can secure a forward long-range field of view without requiring an additional light source by controlling a value of current supplied to a light source installed in a lamp unit.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an automotive lamp having a plurality of light distribution patterns of Class-W, Class-V, Class-C, Class-E, and High. The automotive lamp includes: a plurality of lamp units in which light-emitting diodes (LEDs) turned on or off according to each of the light distribution patterns are installed; an actuator driving the lamp units; and a controller enabling a switch from any one of the light distribution patterns to another one of the light distribution patterns by controlling at least one of the actuator and a value of current supplied to each of the lamp units.

According to another aspect of the present invention, there is provided an automotive lamp having a plurality of light distribution patterns of Class-W, Class-V, Class-C, Class-E, and High. The automotive lamp includes: a plurality of lamp units in which LEDs having different illumination patterns are installed; an actuator driving the lamp units; and a controller enabling a switch from any one of the light distribution patterns to another one of the light distribution patterns by controlling at least one of the actuator and a value of current supplied to each of the lamp units in a state where the lamp units are turned on.

BRIEF DESCRIPTION OF THE DRAWINGS

The above and other aspects and features of the present invention will become more apparent by describing in detail exemplary embodiments thereof with reference to the attached drawings, in which:

FIGS. 2 through 4 are schematic diagrams illustrating lamp units for each light distribution pattern according to a first exemplary embodiment of the present invention;

FIG. 6 is a schematic diagram illustrating methods of realizing Class-E according to exemplary embodiments of the present invention;

DETAILED DESCRIPTION OF THE INVENTION

Figure 1:
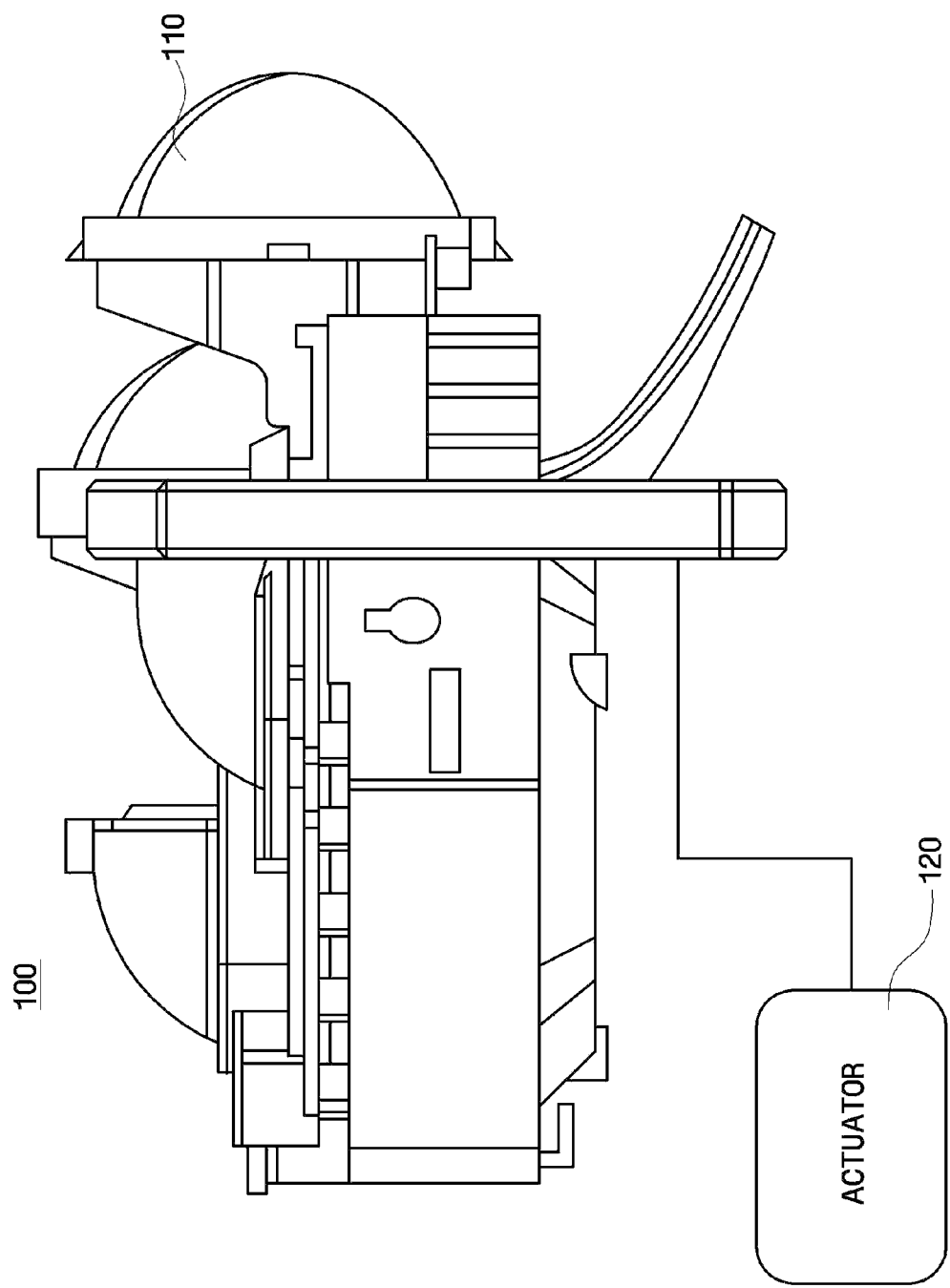
FIG. 1 is a schematic diagram of an automotive lamp according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In some embodiments, well-known processing processes, well-known structures and well-known technologies will not be specifically described in order to avoid ambiguous interpretation of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof. As used herein, the term "and/or" includes any and all combinations of one or more of the associated listed items.

Embodiments of the invention are described herein with reference to cross-section and/or schematic illustrations that are illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In addition, each component shown in figures of the present invention may have been enlarged or reduced for ease of description. Like numbers refer to like elements throughout.

Hereinafter, an automotive lamp according to exemplary embodiments of the present invention will be described with reference to the attached drawings.

FIG. 1 is a schematic diagram of an automotive lamp 100 according to an exemplary embodiment of the present invention. Referring to FIG. 1, the automotive lamp 100 according to the exemplary embodiment may include a lamp unit 110 including one or more light sources and an actuator 120 elevating the lamp unit 110 in a predetermined direction according to a light distribution pattern.

The lamp unit 110 according to the exemplary embodiment may include a light source, a lens, a reflector, and a housing. The light source may be a light-emitting diode (LED). However, the LED is merely an example used to promote the understanding of the present invention, and the present invention is not limited to the LED. That is, various types of light sources can be used.

One or more lamp units 110 may be implemented according to the number of light sources. For example, an equal number of lamp units 110 to the number of light sources may be implemented, or one lamp unit 110 may be implemented for a plurality of light sources.

In the following exemplary embodiments, a case where an equal number of lamp units 110 to the number of light sources are implemented and are rotated in the same direction by the actuator 120 will be described as an example.

Figure 4:
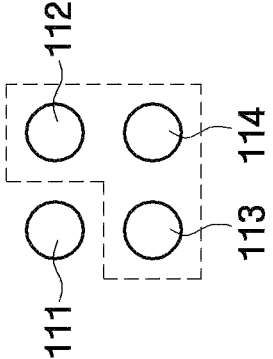

FIGS. 2 through 4 are schematic diagrams illustrating lamp units for each light distribution pattern according to a first exemplary embodiment of the present invention. In FIGS. 2 through 4, four lamp units 110, specifically, first through fourth 111 through 114 are illustrated. In FIGS. 2 through 4, lamp units enclosed in a dotted line are turned on in a corresponding light distribution pattern. That is, a different group of the first through fourth lamp units 111 through 114 are turned on or off according to a light distribution pattern.

The four lamp units 110 illustrated in FIGS. 2 through 4 is merely an example used to promote the understanding of the present invention. That is, one or more lamp units 110 may be implemented, and a group of lamp units that are turned on for each light distribution pattern may vary according to their use and necessity.

A dotted line in Road Surface Pattern of FIGS. 2 through 4 indicates a road surface pattern of a Class-C light distribution pattern and is illustrated in the drawings to compare the road surface pattern of the Class-C light distribution pattern with road surface patterns of other light distribution patterns.

Light distribution patterns according to an exemplary embodiment may include Class-C, Class-V, Class-E, Class-W, and High. Specifically, Class-C, Class-V, Class-E, and Class-W are light distributions patterns of low beams, and High is a light distribution pattern of high beams.

FIG. 2 is a schematic diagram illustrating Class-V among the above light distribution patterns. Referring to FIG. 2, the first through third lamp units 111 through 113 are turned on. Class-V is a light distribution pattern suitable for vehicles driving in an environment (e.g., on city roads) in which more than a certain level of brightness is secured by ambient lighting. In particular, Class-V ensures a wider horizontal field of view and a shorter seeing distance (50 to 60 meters ahead of a vehicle) than Class-C.

FIG. 3 is a schematic diagram illustrating Class-C among the above light distribution patterns. Referring to FIG. 3, the second through fourth lamp units 112 through 114 are turned on. Class-C is a light distribution pattern suitable for use when a vehicle is driving on a country road or when there is no need to apply other light distribution patterns since a vehicle is driving in no special conditions. When compared with general low beams, Cass-C can be understood as a light distribution pattern that secures a clear view of oncoming traffic in the opposite lane and increases the amount of light.

FIG. 4 is a schematic diagram illustrating Class-E among the above light distribution patterns. Referring to FIG. 4, the second through fourth lamp units 112 through 114 are turned on as in the case of Class-C. Class-E is a light distribution pattern suitable for vehicles driving on expressways or on mostly straight roads. A forward long-range field of view in Class-E is somewhat longer than that in Class-C.

Figure 5:
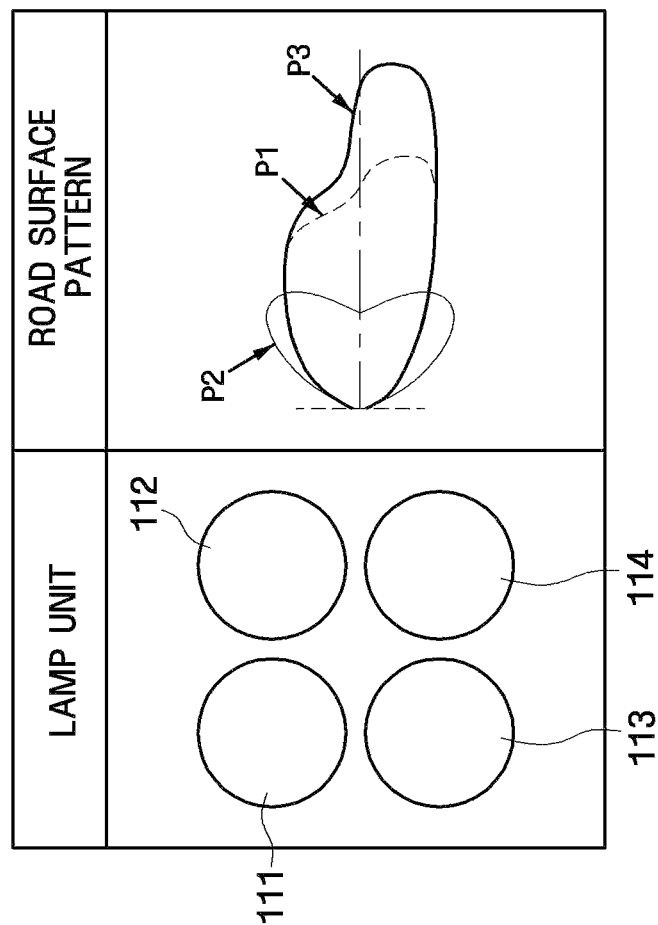
FIG. 5 is a schematic diagram illustrating lamp units according to a second exemplary embodiment of the present invention.

FIG. 5 is a schematic diagram illustrating lamp units for each light distribution pattern according to a second exemplary embodiment of the present invention. As in FIGS. 2 through 4, four lamp units 110, specifically, first through fourth lamp units 111 through 114 are illustrated in FIG. 5. The first through fourth lamp units 111 through 114 are distinguished from each other by their illumination patterns. A switch between the light distribution patterns can be made by controlling a value of current supplied to each of the first through fourth lamp units 111 through 114. The reason why a current value is used to switch between the light distribution patterns is that each of the first through fourth lamp units 111 through 114 is implemented as an LED whose amount of light is controlled by the current value. In FIG. 5, while the first through fourth lamp units 111 through 114 are all turned on, the value of current supplied to each of the first through fourth lamp units 111 through 114 is controlled to switch between the light distribution patterns.

As described above, in the second exemplary embodiment of the present invention, the first through fourth lamp units 111 through 114 are distinguished from each other by their illumination patterns. For example, the first and second lamp units 111 and 112 may be lamp units for lateral spread illumination, the third lamp unit 113 may be a lamp unit for short-distance, wide-area illumination, and the fourth lamp unit 114 may be a lamp unit for long-distance illumination and have a relatively longer illumination distance than the third lamp unit 113. In the second exemplary embodiment of the present invention, a case where the fourth lamp unit 113 has an illumination distance corresponding to Class-C will be described as an example.

In the second exemplary embodiment of the present invention, road surface patterns P1 through P3 of FIG. 5 correspond to illumination patterns of the lamp units for lateral spread illumination, the lamp unit for short-distance wide-area illumination, and the lamp unit for long-distance illumination, respectively.

In addition, in the second exemplary embodiment of the present invention, an initial value of current supplied to the first and second lamp units 111 and 112, an initial value of current supplied to the third lamp unit 113, and an initial value of current supplied to the fourth lamp unit 114 will be referred to as first, second and third reference current values, respectively.

In order to realize Class-V using the first through fourth lamp units 111 through 114 shown in FIG. 5, current having a value corresponding to approximately 20% of the third reference current value may be supplied to the fourth lamp unit 114, thereby controlling the fourth lamp unit 114 to emit light to a distance shorter than its illumination distance achieved when current having the third reference current value is supplied to the fourth lamp unit 114. In addition, the third lamp unit 113 may be controlled to emit horizontally wide light by maintaining the second reference current value of the third lamp unit 113 unchanged. When the current value of the fourth lamp unit 114 is reduced while the current value of the third lamp unit 113 is maintained unchanged as described above, a road surface pattern (such as Class-V of FIG. 2) which illuminates a shorter distance than Class-C can be realized.

In order to realize Class-C using the first through fourth lamp units 111 through 114 shown in FIG. 5, the third reference current value of the fourth lamp unit 114 may be maintained unchanged while the current value of the third lamp unit 113 is reduced to approximately 40% of the second reference current value. Accordingly, a horizontal width of light at a short distance is reduced, and the fourth lamp unit 114 illuminates a long distance, thereby realizing Class-C as shown in FIG. 3.

That is, in the present invention, a switch between the light distribution patterns can be made by turning on or off the first through fourth lamp units 111 through 114 as described above with reference to FIGS. 2 through 4 or by controlling the value of current supplied to each of the first through fourth lamp units 111 through 114 while the first through fourth lamp units 111 through 114 are turned on as described above with reference to FIG. 5.

To realize Class-E which has a slightly longer forward long-range field of view than Class-C, a light source for long-distance illumination is usually installed in addition to the first through fourth lamp units 111 through 114. However, the addition of the light source for long-distance illumination not only increases cost and power consumption but also complicates the structure. In other words, lamp units that are turned on among the first through fourth lamp units 111 through 114 are the same for Class-C and Class-E. However, in order to realize Class-E, another light source is installed in addition to the first through fourth lamp units 111 through 114, thereby increasing cost and power consumption and complicating the structure.

Therefore, in exemplary embodiments of the present invention, a switch from Class-C to Class-E is made without installing an additional light source for long-distance illumination. That is, the lamp units 110 may be elevated using the actuator 120 or the value of current supplied to each light source, i.e., each of the lamp units 110 may be increased. Even in Class-E, the forward field of view can be controlled by adjusting the elevation angle of the lamp units 110 or power supplied to the lamp units 110 according to the speed of a vehicle.

FIG. 6 is a schematic diagram illustrating various exemplary embodiments of a method of realizing Class-E.

Referring to first through third exemplary embodiments of FIG. 6, at least one of the elevation angle of the lamp units 110 and the value of current supplied to each of the lamp units 110 (i.e., light sources) is controlled to realize various forms of Class-E.

In the first exemplary embodiment, a current of 400 mA is supplied in Class-C. However, when the speed of a vehicle is 80 km, the current is increased to 600 mA. When the speed of the vehicle is 90 km, the elevation angle of the lamp units 110 is increased by 0.5 degrees while the current remains unchanged. When the speed of the vehicle is 100 km, the elevation angle of the lamp units 110 is additionally increased by 0.5 degrees while the current remains unchanged.

In the second exemplary embodiment, for a switch from Class-C to Class-E, the current is not changed. Instead, the elevation angle of the lamp units 110 is increased by 0.3 degrees when the speed of the vehicle is 80 km and is additionally increased by 0.3 degrees whenever the speed of the vehicle is increased to 90 km and 100 km. In a reference case of the second exemplary embodiment, the elevation angle of the lamp units 110 is zero degrees. However, this is just to show that the elevation angle of the lamp units 110 is increased by 0.3 degrees whenever the speed of the vehicle is increased but does not mean that the actual angle of the lamp units 110 in the reference case is zero degrees with respect to the ground. In other words, if the angle of the lamp units 110 in the reference case is 10 degrees with respect to the ground, it may be increased by 0.3 degrees from 10 degrees.

In the third exemplary embodiment, when a current of 400 mA is supplied in Class-C, the current may be increased to 450 mA, 500 mA, and 600 mA whenever the speed of the vehicle is increased to 80 km, 90 km, and 100 km.

In FIG. 6, whenever the speed of a vehicle is increased, only the elevation angle or the current is increased, or the elevation angle is increased in a state where the current is maintained unchanged after being increased. However, the present invention is not limited to these examples. The current can be increased in a state where the elevation angle is maintained unchanged after being increased.

That is, in exemplary embodiments of the present invention, at least one of the elevation angle of the lamp units 110 and the power supplied to the lamp units 110 can be used to switch from Class-C to Class-E and deal with an increase in the speed of a vehicle.

Therefore, in exemplary embodiments of the present invention, Class-E can be realized by controlling at least one of the elevation angle and current value of each of the lamp units 110 without adding a light source for long-distance illumination. Consequently, an increase in cost can be prevented, and power consumption can be reduced by the absence of the additional light source.

Other light distribution patterns are also available besides the light distribution patterns described above with reference to FIGS. 2 through 4. Class-W is a light distribution pattern suitable for vehicles driving on wet roads in the rain. In Class-W, light is hindered from reaching a short distance ahead of a vehicle in order to prevent the light from being reflected by the rain and thus dazzling a driver of the vehicle. High is a light distribution pattern suitable for use when a driver needs to secure a long-range field of view and detect an obstacle while driving at night in a state where there is no traffic in the opposite lane or ahead of the vehicle.

Figure 7:
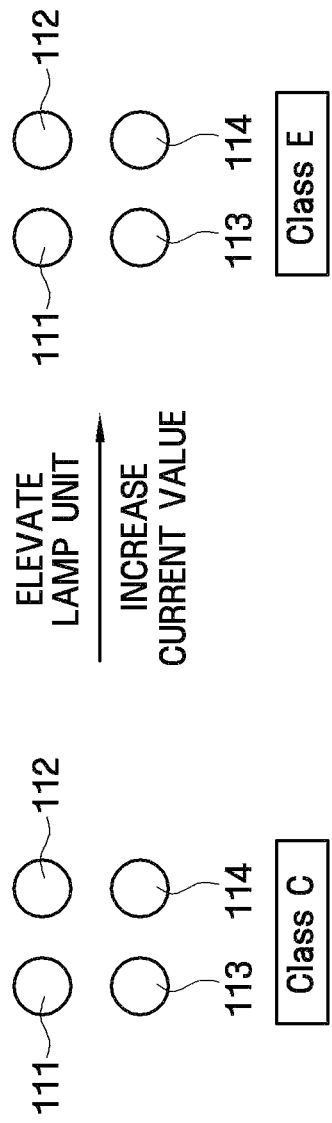
FIGS. 7 through 9 are schematic diagrams illustrating methods of realizing Class-E according to exemplary embodiments of the present invention.
Figure 8:
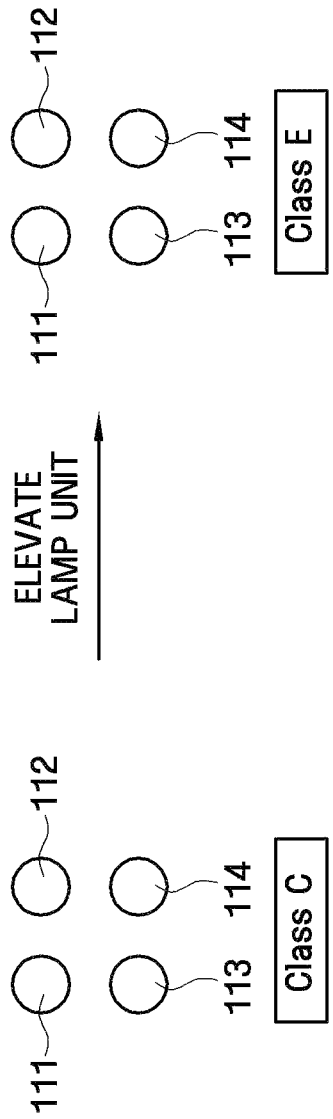
Figure 9:
Figure 10:
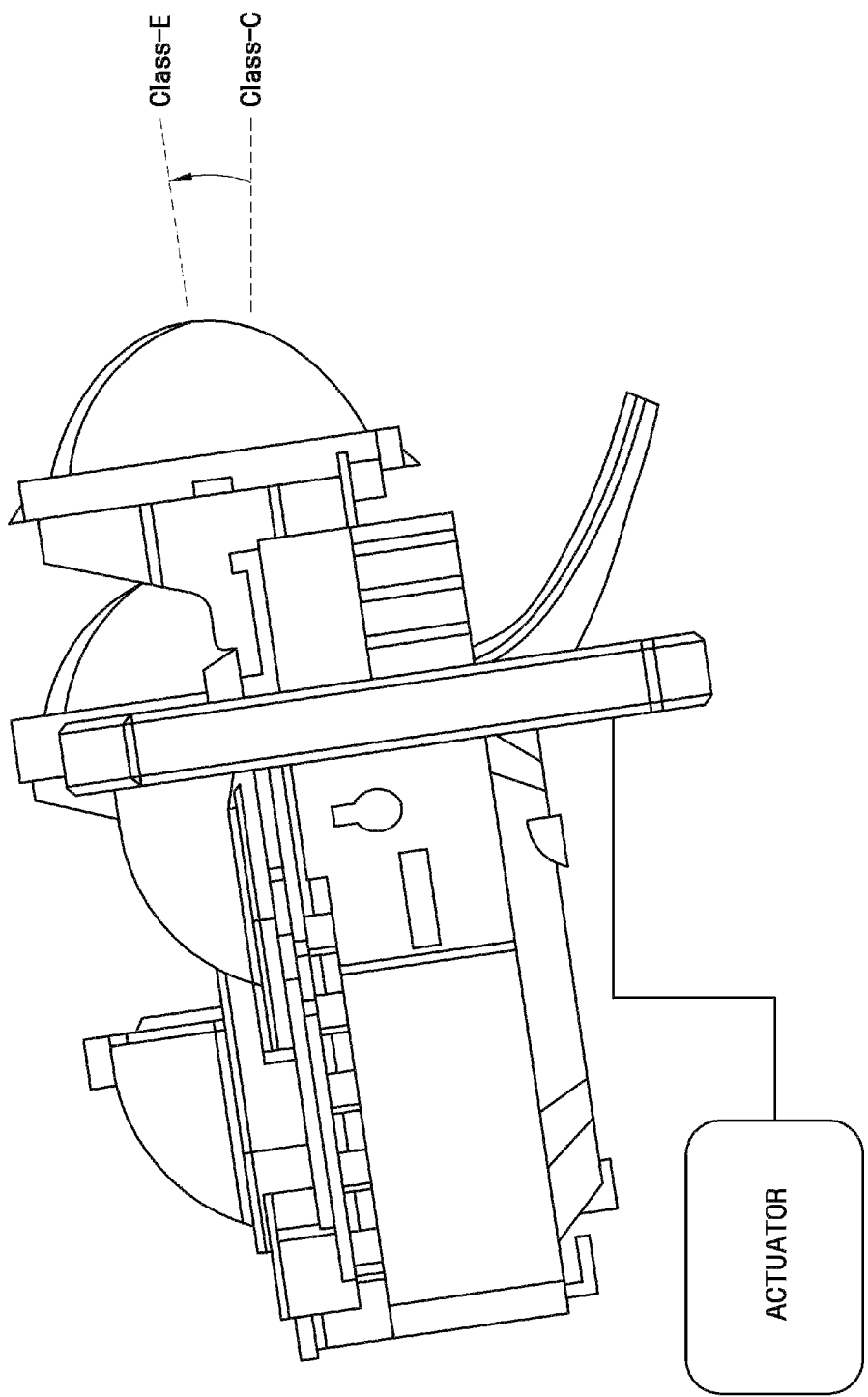
FIG. 10 is a schematic diagram illustrating lamp units elevated according to an exemplary embodiment of the present invention.

To switch from Class-C to Class-E, any one of methods illustrated in FIGS. 7 through 9 can be used in exemplary embodiments of the present invention.

In FIG. 7, to switch from Class-C to Class-E, the lamp units 110 are elevated while the current value of each of the lamp units 110 is increased. FIG. 8, only the elevation of the lamp units 110 is used to switch from Class-C to Class-E. In FIG. 9, only the current value of each of the lamp units 110 is increased to switch from Class-C to Class-E.

The elevation of the lamp units 110 in FIGS. 7 and 8 denotes that the lamp units 110 are elevated by a predetermined angle to switch from Class-C to Class-E.

Figure 11:
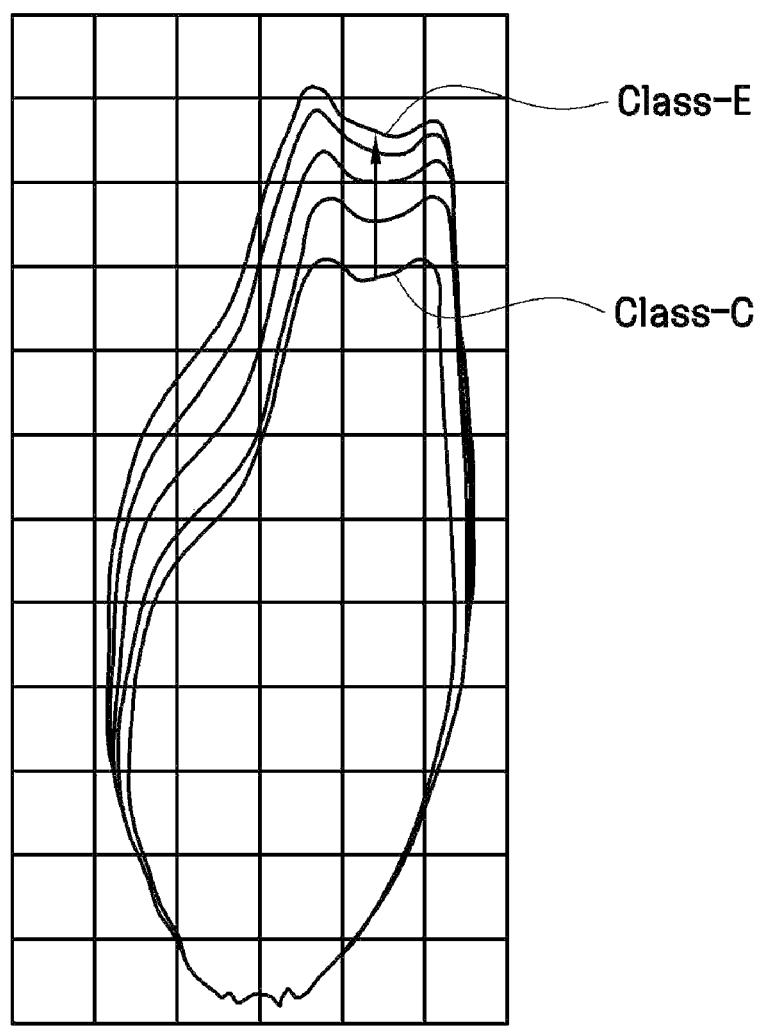
FIG. 11 is a schematic diagram illustrating road surface patterns realized by the elevation of lamp units according to an exemplary embodiment of the present invention.

FIG. 11 is a schematic diagram illustrating a road surface pattern for each elevation angle of the lamp units 110 according to an exemplary embodiment of the present invention.

Referring to FIG. 11, as the elevation angle of the lamp units 110 in Class-C increases, the road surface pattern is changed, thus realizing Class-E and increasing the forward field of view.

The methods of switching from Class-C to Class-E described above with reference to FIGS. 7 through 9 can all be used for lamp units which are turned on or off for each light distribution pattern as shown in FIGS. 2 through 4 and lamp units whose current values are controlled for each light distribution pattern as shown in FIG. 5.

In the above exemplary embodiments of the present invention, a case where a current value is controlled to switch from Class-C to Class-E has been described. However, this is merely an example used to promote the understanding of the present invention, and the present invention is not limited to this example. The current value can also be controlled to change the illumination pattern according to road conditions under which a vehicle travels.

Figure 12:
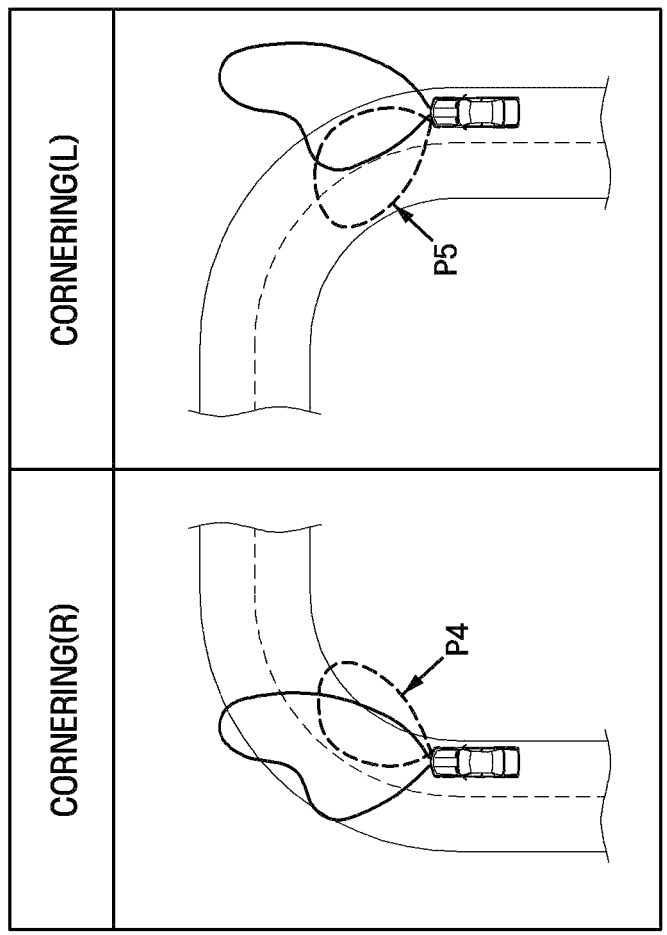
FIG. 12 is a schematic diagram illustrating a road surface pattern realized by lamp units in view of road conditions according to an exemplary embodiment of the present invention.

For example, referring to FIG. 12, when there is a left or right curve in the road on which a vehicle is travelling, the vehicle has to corner to the left or right. In this case, the value of current supplied to a lamp unit (i.e., the third lamp unit 113) for short-distance wide-area illumination, which is installed in each of lamps on the right and left of the vehicle, may be increased. Accordingly, an additional light distribution pattern can be secured in the travelling direction of the vehicle, thus giving a driver better visibility during cornering.

In FIG. 12, a light distribution pattern for cornering to the right is P4, and a light distribution pattern for cornering to the left is P5.

In the exemplary embodiments of the present invention, a controller 200 for controlling the elevation angle of the lamp units 110 or the power supplied to the lamp units 110 according to the light distribution pattern or the driving conditions of a vehicle may further be provided.

Figure 13:
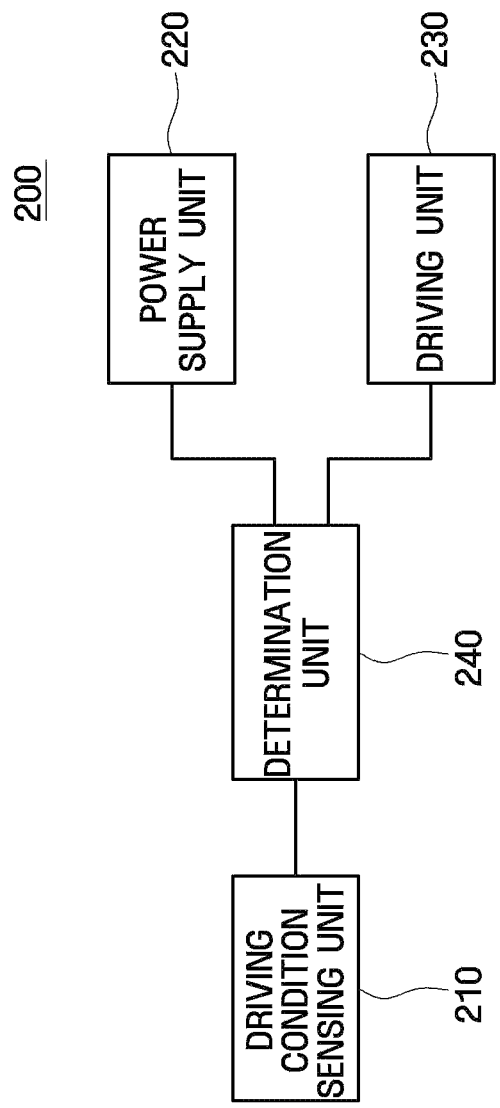
FIG. 13 is a block diagram of a controller according to an exemplary embodiment of the present invention.

FIG. 13 is a block diagram of the controller 200 according to an exemplary embodiment of the present invention.

Referring to FIG. 13, the controller 200 may control the power supplied to the actuator 120 and light sources and may include a driving condition sensing unit 210, a power supply unit 220, and a driving unit 230.

The driving condition sensing unit 210 senses the speed of a vehicle, a switch between light distribution patterns, road conditions, and the like.

The power supply unit 220 controls the value of current supplied to a light source of each of the lamp units 110, and the driving unit 230 controls the elevation angle of the lamp units 110 by controlling the actuator 120.

A determination unit 240 may control at least one of the power supply unit 220 and the driving unit 230 based on conditions set when the vehicle is released or conditions set by a driver. Here, the conditions may include whether to control the current value or the elevation angle in order to switch from Class-C to Class-E as described above with reference to FIG. 6, a value to which the current value is adjusted or an angle by which the elevation angle is adjusted, and the like.

An automotive lamp according to the present invention provides at least one of the following advantages.

Since an LED is used as a light source, a switch between light distribution patterns can be made without using a mechanical structure. Furthermore, a forward long-range field of view can be secured without requiring an additional light source by controlling at least one of an elevation angle of a lamp unit, in which a light source is installed, and a value of current supplied to the light source.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. The scope of the present invention is defined by the following claims, rather than by the above-described detailed description. The meanings and scope of the claims, and all modifications or modified shapes, which are derived from equivalent concepts thereof, should be understood as being included in the scope of the present invention.

What is claimed is:

1. An automotive lamp having a plurality of light distribution patterns of Class-W, Class-V, Class-C, Class-E, and High, the automotive lamp comprising:
    a plurality of lamp units in which light-emitting diodes (LEDs) turned on or off according to each of the light distribution patterns are installed;
    an actuator driving the lamp units; and
    a controller enabling a switch from any one of the light distribution patterns to another one of the light distribution patterns by controlling at least one of the actuator and a value of current supplied to each of the lamp units.

2. The automotive lamp of claim 1, wherein a switch between the light distribution patterns is made according to driving condition of a vehicle, and the driving conditions of the vehicle comprise at least one of a speed of the vehicle and road conditions.

3. The automotive lamp of claim 1, wherein the actuator elevates the lamp units by a predetermined angle.

4. The automotive lamp of claim 3, wherein the controller enables a switch from the Class-C light distribution pattern to the Class-E light distribution pattern by controlling at least one of an elevation angle of the lamp units and the value of current supplied to each of the lamp units.

5. The automotive lamp of claim 3, wherein the controller comprises:
   a driving condition sensing unit sensing the driving conditions of the vehicle;
   a power supply unit controlling the value of current supplied to each of the lamp units;
   a driving unit controlling the elevation angle of the lamp units by driving the actuator; and
   a determination unit determining whether to control the power supply unit and the driving unit.

6. An automotive lamp having a plurality of light distribution patterns of Class-W, Class-V, Class-C, Class-E, and High, the automotive lamp comprising:
   a plurality of lamp units in which LEDs having different illumination patterns are installed;
   an actuator driving the lamp units; and
   a controller enabling a switch from any one of the light distribution patterns to another one of the light distribution patterns by controlling at least one of the actuator and a value of current supplied to each of the lamp units in a state where the lamp units are turned on.

7. The automotive lamp of claim 6, wherein a switch between the light distribution patterns is made according to driving conditions of a vehicle, and the driving conditions of the vehicle comprise at least one of a speed of the vehicle and road conditions.

8. The automotive lamp of claim 6, wherein the lamp units comprise:
   a lamp unit for lateral spread illumination;
   a lamp unit for short-distance, wide-area illumination; and
   a lamp unit for long-distance illumination.

9. The automotive lamp of claim 8, wherein an initial current value of the lamp unit for lateral spread illumination, an initial current value of the lamp unit for short-distance, wide-area illumination, and an initial current value of the lamp unit for long-distance illumination are a first reference current value, a second reference current value, and a third reference current value, respectively, wherein the controller enables a switch between the light distribution patterns by controlling at least one of the first through third reference current values.

10. The automotive lamp of claim 9, wherein the controller reduces the third reference current value and maintains the second reference current value unchanged to realize the Class-V light distribution pattern.

11. The automotive lamp of claim 9, wherein the controller maintains the third reference current value unchanged and reduces the second reference current value to realize the Class-C light distribution pattern.

12. The automotive lamp of claim 8, wherein when the vehicle corners to the left or right, the controller increases the second reference current value of the short-distance, wide-area illumination lamp unit which corresponds to a cornering direction of the vehicle.

13. The automotive lamp of claim 6, wherein the actuator elevates the lamp units by a predetermined angle.

14. The automotive lamp of claim 13, wherein the controller comprises:
   a driving condition sensing unit sensing the driving conditions of the vehicle;
   a power supply unit controlling the value of current supplied to each of the lamp units;
   a driving unit controlling an elevation angle of the lamp units by driving the actuator; and
   a determination unit determining whether to control the power supply unit and the driving unit.

15. The automotive lamp of claim 13, wherein the controller enables a switch from the Class-C light distribution pattern to the Class-E light distribution pattern by controlling at least one of the elevation angle of the lamp units and the value of current supplied to each of the lamp units.

* * * * *